Aug. 15, 1939   J. C. FOSTER   2,169,235
SPECTACLE TEMPLE CONNECTION
Filed July 6, 1936
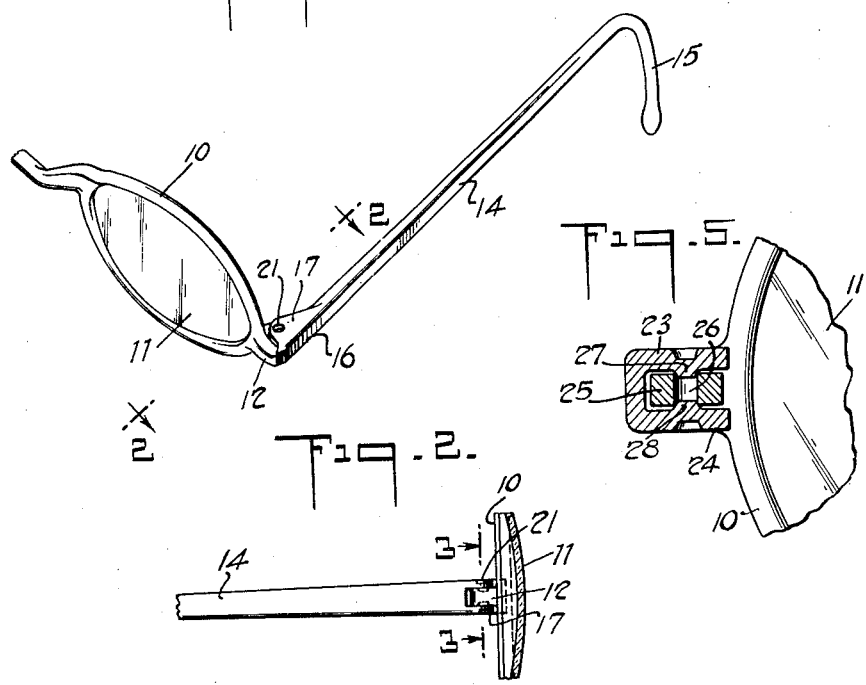
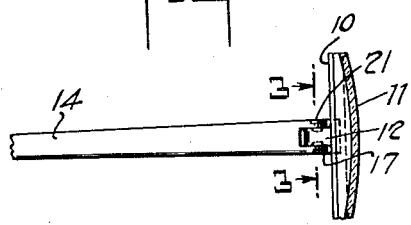
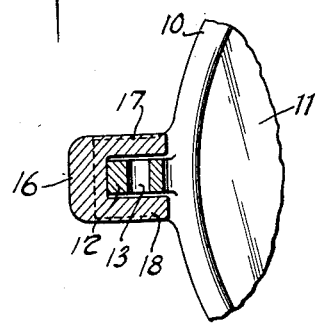
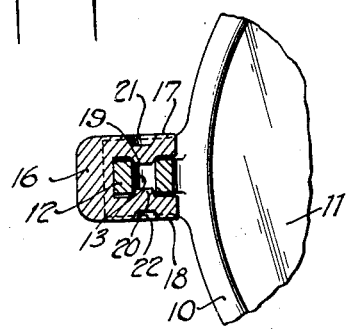
INVENTOR
*Joseph C. Foster.*
BY
ATTORNEY Patented Aug. 15, 1939

2,169,235

UNITED STATES PATENT OFFICE 2,169,235

SPECTACLE TEMPLE CONNECTION

Joseph C. Foster, Leominster, Mass., assignor to Fosgood Corporation, Leominster, Mass., a corporation of Massachusetts Application July 6, 1936, Serial No. 89,026

3 Claims. (Cl. 88—53)

This invention relates to spectacle temple connections, and more particularly to hinge constructions for connecting the temples to the frames of spectacles, sunglasses, goggles, and the like.

One manner of hinging the temples to the frame now commonly employed in the manufacture of the cheaper forms of sunglasses, goggles and spectacles, is to drill a hole through the parts and to connect them pivotally together by means of a pivot pin or rivet secured in the hole.

The principal object of my invention is to provide a hinge construction which dispenses with the necessity of using separate pivot pins and which results in an economy in the manufacture of the article. It will be readily appreciated that economy in manufacture is a very important consideration in the case of articles, such as the eyeglasses to which this invention relates, that are manufactured to sell at a low price.

Other advantages of my invention will appear from the following description thereof, reference being had to the accompanying drawing, in which:

Figure 1 is a perspective view of a spectacle, partly broken away, showing the temple connection;

Fig. 2 is a sectional view thereof taken on the line 2—2 of Figure 1, viewed in the direction of the arrows;

Fig. 3 is a sectional view, on an enlarged scale, taken on the line 3—3 but showing the fork of the temple before it is hingedly connected to the frame;

Fig. 4 is a similar view showing the temple fork hingedly connected to the frame; and Fig. 5 is a sectional view of a modification.

Referring now to the drawing, 10 indicates a spectacle frame, and 11 a lens mounted therein. A lug or extension 12, preferably formed integral with the frame, extends outwardly from each end thereof. A hole 13 is formed through, or partly through, the lug or extension. The lug provides a support to which the temple is pivotally attached as hereinafter described.

The temple 14 has one end 15 curved or bowed, as is usual, to fit behind the ear. The other end 16 of the temple is formed with a fork having two inwardly extending spaced-apart arms or extensions 17 and 18 between which the lug 12 may be received.

Studs, bosses or projections 19 and 20, extending downwardly and upwardly, respectively, from the opposed inner faces of the arms 17 and 18, and formed integral with said arms, are engaged or seated in the upper and lower ends, respectively, of the hole or indentation 13 of the lug or extension 12 to connect the parts pivotally together.

In connecting the temple to the frame the parts are assembled as shown in Fig. 3, that is, with the lug of the frame inserted between the arms or extensions 17 and 18 of the temple. By means of suitable punches or other apparatus, the material of said arms is then indented, as shown in Fig. 4, to form the studs 19 and 20, and to press or stamp the parts together. The formation of the projections or studs on the inner faces of the arms leaves corresponding indentations 21 and 22 in the outer faces.

In Fig. 5 I have shown a modification of the hinge construction. In this instance the fork is formed as a part of the spectacle frame 10 and consists of two arms or extensions 23 and 24 between which the end 25 of the temple is received. The end of the temple has a hole or recess 26 therein. Projections 27 and 28, pressed inwardly from the material of the arms 23—24, seat in the hole 26 and pivotally connect the temple to the frame.

I have found in practice that the invention may be advantageously carried out with frames and temples made of cellulose acetate composition, but I do not limit myself to such material as any suitable material may be employed.

What I claim is:

1. A spectacle frame and temple assembly comprising a frame member and a temple bar member, a two part integral extension extending from one of said members, said two parts being at all times immobile and fixedly spaced with respect to each other, a single integral extension from the other of said members adapted to fit between the two part extension of the first member, a hole bored in said extension of said single extension member and projections forced in the material of the members into each fixedly spaced part of said two part extension member to fit into the ends of the hole of said single extension member whereby a pivotal connection is formed between the frame and temple.

2. A spectacle frame and temple assembly comprising a frame member and temple bar member, an integral lug extending from said frame member, two integral arms extending from said temple member between which said lug member is adapted to fit, said two arms being at all times immobile and fixedly spaced with respect to each other, a hole bored in said lug member, and projections forced in the material of said two extending arms to fit into the hole in said lug member whereby a pivotal connection is formed between the frame and temple.

3. A spectacle frame and temple assembly comprising a frame member and temple bar member, two integral arms extending from said frame member, said arms being at all times immobile and fixedly spaced with respect to each other, an end of said temple member adapted to fit between the spaced arms of said frame member, a hole bored in said end of said temple member, and projections forced in the material of said integral arms of said frame member, said projections fitting into the hole of said temple member whereby a pivotal connection is formed between the frame and temple.

JOSEPH C. FOSTER.